Patented Sept. 4, 1951

2,566,564

UNITED STATES PATENT OFFICE 2,566,564

PROCESS FOR THE MANUFACTURE OF ISO-PHORONE AND HOMO-ISOPHORONES

Hugh Campbell Highet and Francis Edward Salt, Banstead, England, assignors to The Distillers Company, Limited, Edinburgh, Scotland, a British company No Drawing. Application September 6, 1947, Serial No. 772,588. In Great Britain September 10, 1946

6 Claims. (Cl. 260—586)

This invention relates to a process for the manufacture of isophorone and related products and refers in particular to the condensation of saturated ketones by means of alkali metal hydroxides.

The preparation of isophorone and related products from saturated ketones by condensation with the aid of alkaline condensation catalysts is well known and a number of such catalysts have been suggested. Amongst these condensation catalysts, quick lime, sodium amide and sodium ethylate have been named. It has also been stated in Annalen der Chemie volume 433, at page 314 that, when ketones are allowed to stand at ordinary room temperature in the presence of aqueous or alcoholic alkali solutions, condensation takes place.

In United States Patent Specification No. 2,399,976 there is described a method of effecting the condensation of ketones, particularly acetone, by means of aqueous alkali metal hydroxide solutions, the concentration of which is between 15% and 35% by weight. As the condensation reaction liberates two molecules of water for each molecule of isophorone produced, this water has to be removed when the process is conducted in a continuous manner in order to maintain the alkali metal hydroxide concentration constant within the range of 15 to 35%. The removal of the liberated water is effected by withdrawing from the reaction zone a portion of the organic liquid phase which contains the major part of the unreacted acetone and, dissolved therein or mixed therewith, the water of reaction. The other phase, from which the organic phase is separated, consists substantially of the alkaline solution which is adjusted to the said strength, 15% to 35%, by regulating the amount of the organic phase withdrawn. In some cases it was thought desirable to add some water to the ketone feed with a view to keeping the water to alkali metal hydroxide ratio between 5.66:1 and 1.8:1 by weight, that is between 15% and 35%.

The two phases of which these reaction mixtures consist according to said United States patent have to be brought into intimate contact by suitable mechanical means such as turbomixers, churning or mixing devices. It is evident that the use of turbomixers or other agitating devices at temperatures exceeding 130° C. and at the high pressures necessitated thereby to keep the materials in the reaction zone, particularly the ketone e. g., acetone, in the liquid phase, and which are stated to be about 300 lbs. per square inch, requires an elaborate and complicated equipment.

It is an object of this invention to provide a process which furnishes isophorone and related products in very good yields without the necessity of providing mechanical means for bringing the two phases into intimate contact.

The invention accordingly comprises the novel processes and steps of processes, specific embodiments of which are described hereinafter by way of example and in accordance with which we now prefer to practice the invention.

According to the present invention, a process for the production of isophorone and homo-isophorones comprises subjecting a saturated ketone containing 3 to 5 carbon atoms in the molecule and an aqueous alkali metal hydroxide solution of a concentration which is in the range of .2 to 10% by weight with respect to the hydroxide therein and which is sufficiently low to dissolve an appreciable proportion of the ketone and thereby allow the reaction to occur in said solution, to a temperature within the range between 175° C. and the critical temperature of the ketone, whilst maintaining sufficient pressure in the reaction zone to maintain the contents in said zone substantially in the liquid phase.

The preferred concentrations of the aqueous alkali metal hydroxide solution, e. g. sodium hydroxide, are between 0.2% and 10% by weight of the alki metal hydroxide but concentrations of 0.5% to 1.5% are most advantageous. The ratio of ketone, e. g. acetone, to the aqueous alkali metal hydroxide solution may vary within wide limits. It has been found that a ratio of 40 to 70 parts by weight of acetone to 60 to 30 parts by weight of the dilute alkali metal hydroxide solution yields particularly good results. The temperature range at which the condensation reaction best proceeds lies between 175° C. and 235° C. most advantageously between 175° and 220° C.

The pressure required to maintain the reaction mixture, particularly the low-boiling ketones, substantially in the liquid phase depends on the kind of ketone to be condensed as also on the temperature at which the condensation is carried out. In general, a pressure of between 250 to 500 lbs. per sq. in. will be sufficient to prevent the major part of each constituent of the reaction mixture from passing into the gaseous phase.

The time which is necessary to effect the condensation of the ketones under the conditions mentioned above and the production of isophorone or homologous compounds thereof, but without leading to any substantial production of condensation products arising from the condensation of more than three molocules of the initial ketone, varies from about half an hour to two hours.

When ketones, e. g. acetone, are mixed with aqueous alkali metal hydroxide solutions it can be observed that at ordinary temperature the two liquids are not miscible in all proportions. For instance, when, at room temperature, from 2 ccs. to 455 ccs. of a 10% by weight aqueous solution of sodium hydroxide are added to 100 gms. of acetone, the mixture separates into two phases, one phase containing a preponderance of the acetone and the other phase containing chiefly the aqueous hydroxide solution. A similar separation into two layers occurs with aqueous alkali metal hydroxide solutions of lesser concentrations. For example, a 1% by weight aqueous solution of sodium hydroxide forms a two phase mixture when up to about 50 gms. of the aqueous alkali are added to 100 gms. of acetone. It is quite surprising that when a two phase mixture is heated under pressure to the reaction temperatures, condensation is achieved in the absence of any mechanical agitation which would produce an intimate contact between the two phases. That a satisfactory result is obtained when working without mixing the phases is due to the fact that, under the reaction conditions, a certain proportion of the ketone is dissolved in the aqueous alkali metal hydroxide solution owing to its low concentration, and becomes condensed under the catalytic influence of the alkali metal hydroxide. The condensation product thus formed, being insoluble in the aqueous solution, is then taken up by the organic layer, whilst fresh quantities of the ketone may then be dissolved in the aqueous solution.

The process of the present invention may be carried out in a continuous manner. For this purpose, the ketone and the aqueous alkali metal hydroxide solution are passed, under the required pressure through a heated reaction zone at such a rate that the time of passage of the mixture through the said zone is sufficient to achieve the condensation. It is a feature of the process to employ a long and comparatively narrow tube preferably in the form of a coil, as reactor. As the time required for the conversion is more than one half hour, and may be two hours or more, it is clear that no turbulence is caused in the mixture. The reaction mixture after having passed through the heated zone is removed from the reactor and worked up for the recovery of the reaction products, on the one hand, and of unreacted acetone and aqueous catalyst on the other, whilst fresh ketone and aqueous alkali metal hydroxide solution are fed into the reactor simultaneously and substantially commensurately to the amount of reaction mixture removed therefrom. We prefer, when working in a continuous manner, to add the ketone and the aqueous alkali metal hydroxide solution in a single phase mixture as it is thereby possible to feed the fresh material into the system with a single pump. A two phase mixture would require two pumps and necessitate careful adjustment of the respective feeds of the ketone and the catalyst solution.

The following examples, in which the parts and percentages quoted are calculated by weight, illustrate the manner in which the invention may be carried into effect:

*Example 1.*—60 parts of acetone were heated with 40 parts of a solution containing 39.6 parts of water and 0.4 part of sodium hydroxide in a closed vessel to 190°C. under a pressure of from 230 to 300 lb. per sq. in. for two hours. The reaction product, after distilling off the acetone, formed two layers. The organic upper layer was separated from the aqueous solution and subjected to fractional distillation. 75.0% of the initial acetone was recovered whilst 25% by weight was converted into condensation products or mechanically lost. Calculated on 100 mols of acetone consumed, 15.2 mols were condensed into mesityl oxide and 58.6 into isophorone.

*Example 2.*—The following table, in which the figures for mesityl oxide, isophorone and the higher condensation products are also calculated on the basis of 100 mols of acetone consumed, shows how variation of the different factors affect the result:

| Exp. | Parts of Acetone | Parts of Water | Parts of Catalyst | Time, Hrs. | Temperature, °C. | Pressure, lbs. per sq. in. | Per Cent By Weight Acetone Condensed/Acetone Charged | Mols Acetone Condensed per 100 Mols Acetone reacted— | | |
|---|---|---|---|---|---|---|---|---|---|---|
| | | | | | | | | To Mesityl Oxide | To Isophorone | To Higher Condensation Products |
| 1 | 66.7 | 33 | NaOH, .33 | 2 | 200-218 | 300-450 | 42.5 | 1.4 | 63.0 | 14.4 |
| 2 | 90 | 9 | NaOH, 1.0 | 2 | 178 | 270 | 11.2 | 63.0 | 37.0 | |
| 3 | 66.7 | 33 | NaOH, .33 | 1 | 215-218 | 380-440 | 33.8 | Trace | 70.1 | 18.4 |
| 4 | 66.7 | 33 | KOH, .33 | 1 | 213-218 | 380-440 | 32.7 | | 67.6 | 18.1 |

*Example 3.*—The reactor consisted of a mild steel tube 32 feet long and of a ¼ in. internal diameter shaped into an 8 in. diameter coil immersed in an oil bath. The upper outlet end of the coil was connected to the lower end of a cooling coil, 9 feet long, immersed in water. At the upper end thereof it was fitted with a pressure reducing valve through which the reaction mixture passed into a receiver.

The reaction volume of the tube was 308 cc. The bath temperature was kept at 217° C., the pressure in the reactor above about 560 lb. per sq. in.

The composition of the reaction mixture was 66.7 parts of acetone, 33.0 parts of water, and 0.33 part of sodium hydroxide. 325 ccs. per hour of the reaction mixture were introduced into the reactor and an approximately similar amount was removed through the reducing valve. Tests were made after a period of several hours from the start of the run and when the tube contents had attained steady conditions. The residence time, that is the time during which the mixture was at reaction temperature, was 0.95 hour.

71.6% of the acetone was recovered unreacted, while the isophorone fraction (distilled between 200° C. and 230° C.) amounted to 17.0% of the acetone in the feed. Calculated on 100 mols acetone reacted, 75.9 mols were converted into isophorone and 11.2 into higher condensation products with only a trace of mesityl oxide.

What we claim is:

1. In the process for the production of isophorone and homo-isophorones by the condensation of a saturated ketone containing 3 to 5 carbon atoms in the molecule the improvement which comprises bringing a substance consisting essentially of said ketone into initimate contact with an aqueous alkali metal hydroxide solution, in a concentration from 0.2 to 10% by weight with respect to the hydroxide therein at temperatures between 175° C. and the critical temperature of the ketone whilst maintaining sufficient pressure in the reaction zone to maintain the contents therein substantially in the liquid phase.

2. A process according to claim 1, wherein the concentration of said aqueous hydroxide solution is between 0.5 and 1.5%.

3. A process according to claim 1, wherein the ratio of the ketone to said aqueous hydroxide solution is from 40 to 70 parts by weight of the ketone to from 60 to 30 parts by weight of the aqueous hydroxide solution.

4. A process according to claim 3 wherein said ketone is acetone.

5. A continuous process for the production of isophorone and homo-isophorones by the condensation of a saturated ketone containing three to five carbon atoms in the molecule which comprises bringing a substance consisting essentially of said ketone into intimate contact with an aqueous alkali metal hydroxide solution in a concentration from 0.2 to 10% by weight with respect to the hydroxide therein at temperatures in the range between 175° C. and the critical temperature of the ketone whilst maintaining sufficient pressure in the reaction zone to maintain the contents therein substantially in the liquid phase, passing said ketone and said aqueous solution together under pressure and within said temperature range through a reaction zone at a rate to achieve the condensation, and passing further ketone and aqueous hydroxide solution of said concentration into the reaction zone simultaneously and substantially commensurately to the amount of reaction mixture passing therefrom.

6. A continuous process according to claim 5, wherein the ketone and the aqueous solution are passed together into the reaction zone in a single phase mixture.

HUGH CAMPBELL HIGHET.
FRANCIS EDWARD SALT.

REFERENCES CITED

The following references are of record in the file of this patent:

UNITED STATES PATENTS

| Number | Name | Date |
|---|---|---|
| 2,344,226 | Ballard et al. | Mar. 14, 1944 |
| 2,351,352 | McAllister et al. | June 13, 1944 |
| 2,399,976 | Ballard et al. | May 7, 1946 |
| 2,419,051 | Ballard et al. | Apr. 15, 1947 |